(12) United States Patent
Karampuri et al.

(10) Patent No.: US 8,943,031 B2
(45) Date of Patent: Jan. 27, 2015

(54) GRANULAR SELF-HEALING OF A FILE IN A DISTRIBUTED FILE SYSTEM

(75) Inventors: Pranith Kumar Karampuri, Jeedimetla Hyderabad (IN); Anand Vishweswaran Avati, Mysore (IN)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 13/589,370

(22) Filed: Aug. 20, 2012

(65) Prior Publication Data

US 2014/0052705 A1 Feb. 20, 2014

(51) Int. Cl.
*G06F 17/30* (2006.01)

(52) U.S. Cl.
USPC .......................................................... 707/697

(58) Field of Classification Search
USPC ........ 707/3, 205, 674; 709/204–206; 714/5.1; 370/216
See application file for complete search history.

(56) References Cited

U.S. PATENT DOCUMENTS

| 7,275,177 | B2 * | 9/2007 | Armangau et al. ............ 714/5.1 |
| 7,418,439 | B2 | 8/2008 | Wong | |
| 8,224,789 | B1 * | 7/2012 | Caklovic ........................ 707/674 |
| 2004/0066741 | A1 * | 4/2004 | Dinker et al. .................. 370/216 |
| 2005/0027686 | A1 * | 2/2005 | Shipp ................................ 707/3 |
| 2009/0019098 | A1 * | 1/2009 | Gunda et al. ................... 707/205 |

* cited by examiner

*Primary Examiner* — Etienne Leroux
(74) *Attorney, Agent, or Firm* — Lowenstein Sandler LLP

(57) ABSTRACT

A server processing device acquires a lock on a region of a file which has stale data. The server processing device self-heals the stale data in the locked region using current data and receives a write request to modify another region of the file during the self-healing of the locked region of the file. The server processing device provides write access to the requested region during the self-healing of the locked region of the file.

17 Claims, 5 Drawing Sheets

GRANULAR SELF-HEALING OF A FILE IN A DISTRIBUTED FILE SYSTEM

TECHNICAL FIELD

The present disclosure relates to a distributed file system, and more particularly, to granular self-healing of a file in a distributed file system.

BACKGROUND

Data may be stored as unstructured data, for example, in files and directories in a file system. A distributed file system may store multiple copies of a file and/or directory on more than one storage server machine. The replication of the data across multiple storage server machines can help ensure that, in case of a hardware failure and/or system failure, the data should still be accessible. If a storage server machine experiences a failure, the storage server machine may be unavailable, but changes can still be made to the data on the copies of the data on the available storage server machines. The data on the storage server machine that is down may be stale, which is data that no longer is a current version of the data. When the failed storage server machine is powered back up, the changes which were made to the other copies of the data should be propagated to the failed storage server machine. The process of updating the stale data on the storage server machine may be known as "self-healing."

Traditional self-healing solutions lock an entire file for the duration of the self-healing process. When the entire file is locked, client devices may not access the file. In some cases, the self-healing process may take a long period of time if a file is large, which may result in the client devices waiting for a long period of time before the file can be accessed. Particularly in a cloud environment, where a file may be a virtual machine image for instantiating a virtual machine instance in a cloud, traditional self-healing solutions may cause timeouts and virtual machine instances to hang.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
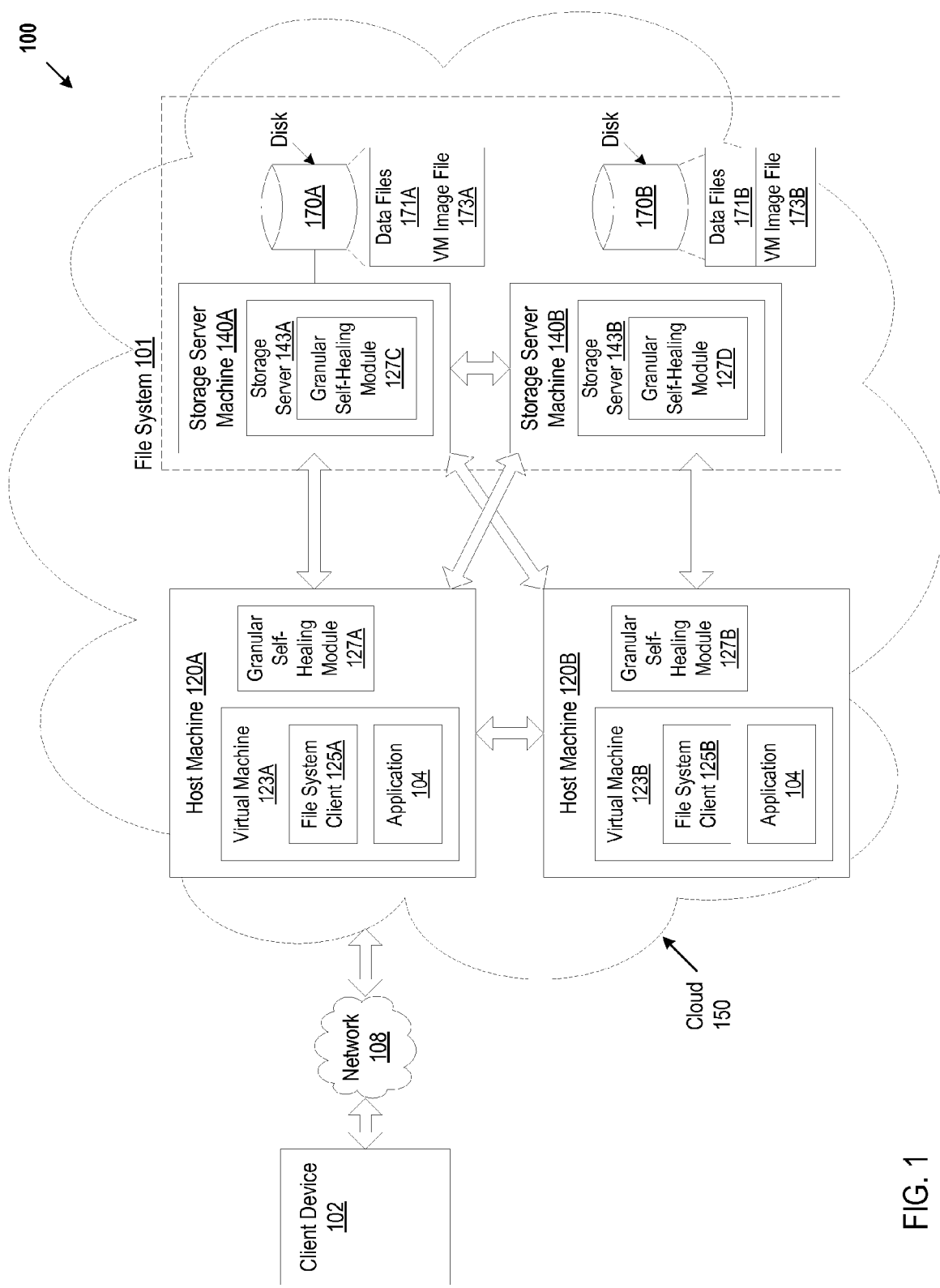
FIG. 1 illustrates an example system architecture, in accordance with various implementations.

Described herein are a method and apparatus for granular self-healing of a file in a distributed file system. A set of storage server machines may store a copy of data in a replication domain to help prevent data loss. For example, each of a set of storage server machines A-D may store a copy of a file-XYZ. Storage server machine-A may experience a system failure and may be unavailable for a period of time. While storage server machine-A is down, changes may be made to the copies of file-XYZ that reside on storage server machine-B, storage server machine-C, and storage server machine-D. File-XYZ on storage server machine-A is a stale copy of data and copies of file-XYZ on storage server machine-B, storage server machine-C, and storage server machine-D are fresh copies of the data. A fresh copy of a file contains the most current version of the data of the file. A stale copy of a file does not contain the most current version of the data of the file.

When storage server machine-A is back up and running, the stale file-XYZ on storage server machine-A should be updated. The process of updating the stale data on the storage server machine to reflect the current version of the data is hereinafter referred to as "self-healing." A granular self-healing module, which is described in greater detail below, can self-heal a stale file (e.g., file XYZ on storage server machine-A). The granular self-healing module can acquire a full-file lock on the stale file to inspect and extract data from one or more change logs corresponding to the file to identify which storage server machines (e.g., storage server machine-B, storage server machine-C, and storage server machine-D) contain a fresh copy of the file. The granular self-healing module can acquire a lock on a region (e.g., 128 kilobytes, 64 kilobytes) of the stale file and release the full-file lock. The granular self-healing module can use a checksum to determine whether the locked region should be self-healed. The stale file may have some regions that contain data that is up to date and should not be self-healed. If a region should be self-healed, the granular self-healing module can change the stale data in the locked region to the current data by reading data for a corresponding region in a fresh copy from a storage server machine (e.g., storage server machine-B) that contains a fresh copy of the file and writing the current data over the stale data in the locked region in the stale file.

The granular self-healing module can iteratively acquire a lock on a next region of the stale file and release the lock on the preceding region to maintain control of the file. The granular self-healing module can grant write access to the unlocked regions of the file while a locked region is being self-healed. For example, while the stale file is being self-healed, the granular self-healing module may receive a write request to access the stale file from an application. If the write request is for the region that is currently locked, the granular self-healing module can instruct the application to wait. If the write request is for another region of the stale file that is unlocked, the granular self-healing module can provide write access to the requested region during the self-healing of the locked region of the stale file. When the granular self-healing module receives a read request, the granular self-healing module can redirect the request to a storage server machine (e.g., storage server machine-B) that contains a fresh copy of the file. When the last region of the file is self-healed, the granular self-healing module can acquire a full-file lock on the file, release the lock on the last region, update the change log to indicate the file is self-healed, and release the full-file lock. The granular self-healing module can self-heal each file in the storage server machine.

Traditionally, write access is denied to a file until the entire file is self-healed and unlocked. The granular self-healing module can reduce the amount of time applications may spend waiting for an entire file to be self-healed before the application may write to the file by allowing write access to regions of a file while another region of the file is being self-healed.

FIG. 1 is an example system architecture 100 for various implementations. The system architecture 100 can include a cloud 150 which can provide virtual machines, such as virtual machines 123A-B. There can be any number of virtual machines 123A-B in the cloud 150. Each virtual machine 123A-B can be hosted on a physical host machine 120A-B configured as part of the cloud 150. For example, virtual machines 123A-B may be respectively hosted on host machines 120A-B in cloud 150. Each host machine 120A-B can be a server computer system, a desktop computer or any other computing device. The host machines 120A-B can communicate to each other via a network (not shown), which may be may be a private network (e.g., a local area network (LAN), a wide area network (WAN), intranet, or other similar private networks) or a public network (e.g., the Internet). The host machines 120A-B can be located in a data center. The cloud 150 can be provided by a cloud provider.

Users can interact with applications 104 executing on the virtual machines 123A-B using client computer systems, such as client device 102. An application 104 can be any type of application including, for example, a web application, a desktop application, a database management application, a browser application, etc. Client devices 102 can be connected to host machines 120A-B via a network 108, which may be may be a private network (e.g., a local area network (LAN), a wide area network (WAN), intranet, or other similar private networks) or a public network (e.g., the Internet). The client device 102 can be a mobile device, a PDA (personal digital assistant), a laptop, a desktop computer, or any other computing device.

The virtual machine 123A-B can be instantiated on the host machine 120A-B using a virtual machine image file 173A-B that may be stored in an image repository. Multiple copies of the virtual machine image file 173A-B can be stored in an image repository on the disks 170A-B for redundancy to prevent data loss. For example, virtual machine image file 173B, which may be a copy of virtual machine image file 173A, may be stored on disk 170B and managed by storage server machine 140B. The image repository can represent a single data structure or multiple data structures (databases, repositories, files, etc.) residing on one or more mass storage devices, such as magnetic or optical storage based disks 170A-B, solid-state drives (SSDs) or hard drives.

The virtual machine image file 123A-B can identify the base operating system and the software package(s) (e.g., file system client 125A-B, application 104A-B) to be loaded on a host machine 120A-B for instantiating a virtual machine 123A-B. A file system client 125A-B allows a virtual machine 123A-B to communicate with the file system 101 and perform operations (e.g., read, write) on the data (e.g., data files 171A-) that is stored in the file system 101.

The cloud 150 can include a distributed file system 101 connected to the host machines 120A-B via a network (not shown). The network may be a public network, a private network, or a combination thereof. A distributed file system 101 can be a network attached storage file system that includes one or more storage server machines 140A-B and any number of disks 170A-B coupled to the storage server machines 143A-B. A storage server machine 140A-B can include a network-accessible server-based functionality (e.g., storage server 143A-B) or other data processing equipment. The storage server machines 140A-B can include, and are not limited to, any data processing device, such as a desktop computer, a laptop computer, a mainframe computer, a personal digital assistant, a server computer, a handheld device or any other device configured to process data.

The storage server machines 140A-B can be configured in a replication domain to store multiple copies of data (e.g., data files 171A-B, virtual machine image files 173A-B) on various disks 170A-B to prevent data loss in case one of the storage servers machine 140A-B is unavailable, for example, due to a system failure or a hardware failure. A data file 171A-B can store data that can be used by an application 104. The storage server machines 140A-B can propagate any changes that are made to a copy to the other copies of the data that are stored on the other disks. For example, disk 170B may store a file 171B. A copy of file 171B may be stored on disk 170A. When a change is made to file 171B, the storage server machine 140B, which may manage file 171B, can contact storage server 140A, which may manage file 171A, to make the same change in file 171A.

When a storage server machine 140A-B is unavailable, for example, the storage server machine 140A-B may have experienced a system failure, changes can be made to the copies of the data (e.g., data files 171A-B, virtual machine image files 173A-B) using another storage server machine 140A-B that is available. When the storage server machine 140A-B becomes available, for example, the storage server machine 140A-B is re-booted, the files in the storage server machine 140A-B may be stale. The files may be stale in that the files on the storage server machine 140A-B that crashed may not match the copies of the file in the other storage server machines 140A-B that were available. A stale copy of the file does not contain the most current version of the data of the file. A fresh copy of the file contains the most current version of the data of the file.

The machines (e.g., storage server machines 140A-B, host machines 120A-B) can include a granular self-healing module 127A-D to self-heal files (e.g., virtual machine image file, data file) that have stale data. The granular self-healing module 127A-D can read data from a fresh copy of the file on another storage server machine, and write the fresh data over the stale data in the file that is being self-healed. For example, storage server machine 140A may be unavailable due to a hardware failure. While the storage server machine 140A is down, a change may be made to the virtual machine image file 173B that is stored on disk 170B that is managed by storage server machine 140B. When the storage server machine 140A is re-booted, the virtual machine image file 173A in the storage server machine 140A is stale because the virtual machine image file 173A does not match the virtual machine image file 173B, which was recently changed by storage server machine 140B while storage server machine 140A was down. A granular self-healing module, for example, granular self-healing module 127A hosted by storage server machine 140A, can read data from the fresh virtual machine image file 173B and write the fresh data over the stale data in the the virtual machine image file 173A that is being self-healed.

The machines (e.g., storage server machines 140A-B, host machines 120A-B) may be in a distributed system which allows any of the granular self-healing modules 127A-D to initiate the self-healing of the stale copy of the file. For example, the self-healing of the file may be performed by the server which went down and powered back up. In another example, the self-healing of the file may be performed a server that has a fresh copy of the file. In another example, the self-healing of the file may be performed a machine that is attempting to access the data of the crashed machine and discovers mismatching data.

The granular self-healing module 127A-D can prevent multiple machines from self-healing the same stale file at the same time by acquiring a lock on the file. The granular self-healing module 127A-D can acquire a lock on one region (e.g., 128 kilobytes) of the file at a time to allow write access, for example, by applications 104, to unlocked regions of the file while the file is being self-healed. For example, when virtual machine image file 173A is being self-healed by granular self-healing module 127A hosted by storage server machine 140A, another granular self-healing module 127C, B,D may detect that the virtual machine image file 173A has stale data and may also attempt to self-heal the virtual machine image file 173A. The incremental locks on the regions of the stale virtual machine image file 173A can prevent the other granular self-healing modules 127C,B,D from interrupting the self-healing process already started by granular self-healing module 127A. Other granular self-healing modules 127B,C,D and/or applications 104, and/or file system clients 125A-B cannot obtain a lock on the file that is being self-healed, until the self-healing process is complete, but write access can be granted to unlocked regions of the file while the file is being self-healed.

Figure 2:
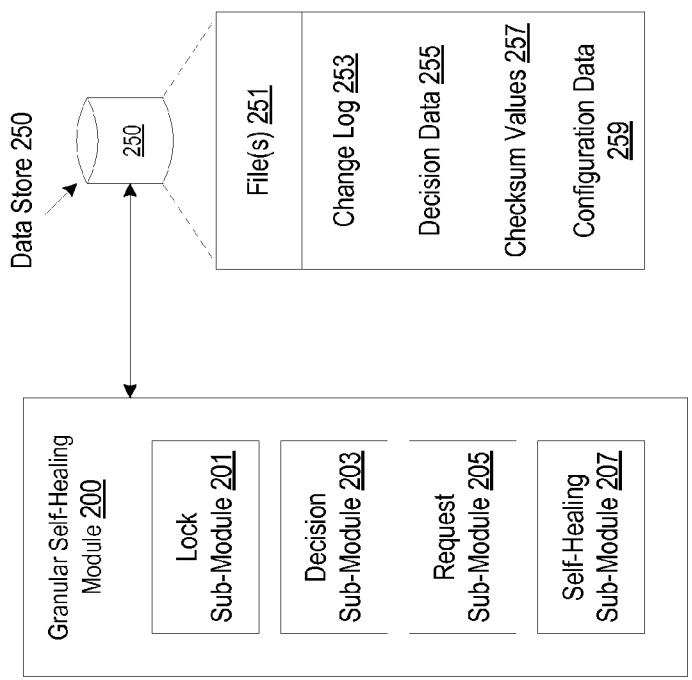
FIG. 2 is a block diagram of an implementation of a granular self-healing module.

FIG. 2 illustrates a block diagram of one implementation of a granular self-healing module 200. The granular self-healing module 200 may correspond to a granular self-healing module 127A-D in a machine 120A-B,140A-B of FIG. 1. The granular self-healing module 200 can include a request sub-module 201, a lock sub-module 203, and a self-healing sub-module 205. Note that in alternative implementations, the functionality of one or more of the sub-modules can be combined or divided.

The lock sub-module 201 can acquire and release a lock on an entire file 251 (e.g., virtual image disk file, data file) that is stored in a data store 250 that is coupled to the granular self-healing module 200. The lock sub-module 201 can acquire and release a lock on a region of the file 251. For example, a region may be 128 kilobytes. In another example, a region may be 64 kilobytes. A region can be a configurable value. The value can be user-configured and stored as configuration data 259 in the data store 250. The lock sub-module 201 can acquire a lock (e.g., full-file lock, region lock) before releasing a previous lock to prevent other systems (e.g., storage servers, applications, etc.) from acquiring a lock on the same file 251. For example, the lock sub-module 201 may first acquire a full-file lock of the file 251, then acquire a lock on a region of the file 251, and then release the full-file lock to maintain control of the file 251. In another example, the lock sub-module 201 may acquire a lock on a last region of the file 251, then acquire a lock on the entire file 251, and then release the lock on the last region of the file 251 to maintain control of the file 251. One implementation describing full-file locks and regional locks is described in greater detail below in conjunction with FIG. 3.

The data store 250 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

The change log 253 for a file 251 can be stored in an extended attribute of the file 251 in the data store 250. The files can have an extended attribute that stores change log data. The change log 253 can include information identifying operations that have succeeded on each version of the file 251. Change logs can be stored in a distributed manner with each copy of the file 251, where each storage server machine that stores a copy of a file 251 can maintain a change log in an extended attribute of the corresponding file. Each copy of the file, for example on different storage servers, can store a part of the change log in an extended attribute of the file. For example, storage server machine-A maintains a change log for file-XYZ in an extended attribute in the local copy of file-XYZ, storage server machine-B maintains a change log for file-XYZ in an extended attribute in the local copy of file-XYZ, storage server machine-C maintains a change log for file-XYZ in an extended attribute in the local copy of file-XYZ, and storage server machine-D maintains a change log for file-XYZ in an extended attribute in the local copy of file-XYZ.

The decision sub-module 203 can inspect a local change log 253 and the other change logs which reside with copies of the file 251 on other storage server machines to determine which storage server machines contain a fresh copy of the file 251 and which storage server machines contain a stale copy of the file 251. The decision sub-module 203 can inspect the change logs when the lock sub-module 201 obtains a full-file lock on the file 251. The full-file lock can prevent write access to the file 251 and can prevent the change log 253 from being modified while the decision sub-module 203 is inspecting the change log 253. The decision sub-module 203 can extract data from the change logs to create decision data 255 indicating which storage servers have a fresh copy of the file 251 and which storage servers have a stale copy of the file 251. The decision data 255 can be stored in the data store 250. In one implementation, the decision data 255 is a decision matrix that identifies which storage servers have a fresh copy of the file 251 and which storage servers have a stale copy of the file 251. For example, the decision sub-module 203 can collect the parts of the change logs from the file copies on the various storage servers and create the decision matrix.

The request sub-module 205 can receive requests to perform an operation on a file 251 (e.g., virtual image disk file, data file). Examples of performing an operation on the data can include, and are not limited to, reading data, writing data, etc. The request can be a file system access command, such as, and not limited to, a read command and a write command. The request can be received over a network from a storage server executing on a storage server machine, an application executing in a virtual machine instance in a host machine, or a client application executing on a client device.

When the granular self-healing module 200 is self-healing a file 251, the request sub-module 205 may receive a request to access the file 251 and may determine whether the request is a read request or a write request. The request sub-module 205 can redirect read requests to another storage server machine that is storing a fresh copy of the data. If the request is a write request, the request sub-module 205 can determine whether the requested data is in a region that is locked. If the region is currently locked, the request sub-module 205 can send a message to the requester (e.g., application) to wait. When the region is unlocked, the request sub-module 205 can allow access to the requested region.

The self-healing sub-module 207 can self-heal stale data in a file 251. When the lock sub-module 201 acquires a lock on a region of the file 251, the self-healing sub-module 207 can determine whether the locked region contains stale data. The self-healing sub-module 207 can use the decision data 255 to identify a storage server that contains a fresh copy of the file 251 and can calculate checksum values for the regions of the fresh copy of the file 251. The checksum values 257 for the fresh copy of the file 251 can be stored in the data store 250. A checksum or hash sum is a fixed-size datum computed from an arbitrary block of digital data. The self-healing sub-module 207 can calculate the checksum using a checksum function or checksum algorithm. When the lock sub-module 201 acquires a lock on a region of the file 251, the self-healing sub-module 207 can calculate a checksum for the locked region and compare the checksum value to a checksum value 257 for the corresponding region in a fresh copy of the file 251. The self-healing sub-module 207 can determine that the locked region does not contain stale data if the checksum values match and can determine that the locked region does contain stale data if the checksum values do not match. When the locked region contains stale data, the self-healing sub-module 207 can read data for the corresponding region from a storage server that contains a fresh copy of the file 251 and write the fresh data over the locked region. When the file 251 is self-healed, the self-healing sub-module 207 can update the change log 253 to indicate the file 251 is self-healed.

Figure 3:
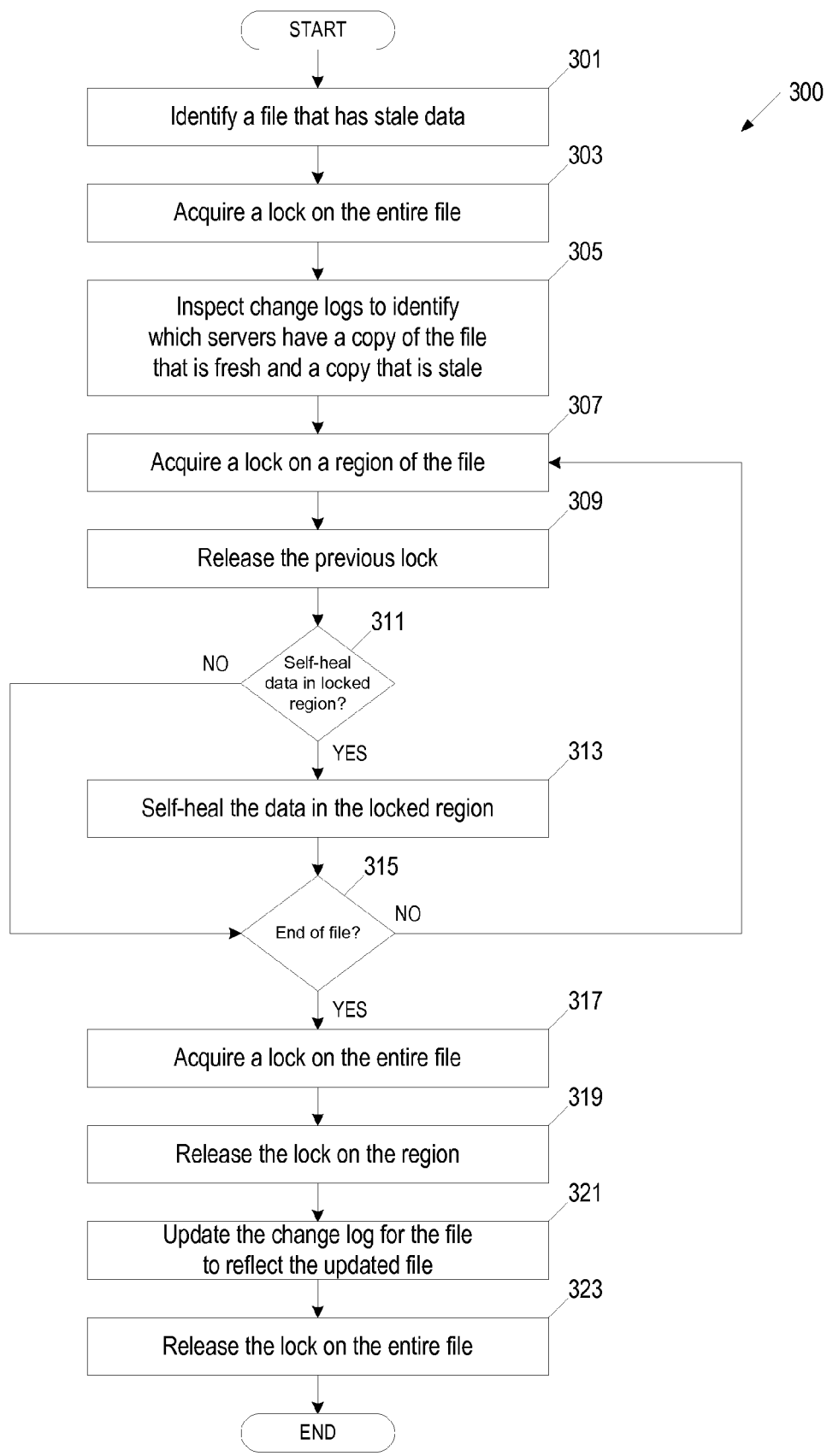
FIG. 3 is a flow diagram illustrating an implementation for a method for granular self-healing of stale data in a file.

FIG. 3 is a flow diagram of an implementation of a method 300 of incrementally locking and self-healing regions of data in a file. Method 300 can be performed by processing logic that can comprise hardware (e.g., circuitry, dedicated logic, programmable logic, microcode, etc.), software (e.g., instructions run on a processing device), or a combination thereof. In one implementation, method 300 is performed by granular self-healing module 127A-D in a machine 120A-B,140A-B of FIG. 1.

At block 301, processing logic identifies a file that has stale data. For example, processing logic may determine that the data in a file does not match the data in a copy of the file. In one example, the file is a virtual machine image file that is stored in a data store. In another example, the file is a data file for a particular application. For example, the file may be word processing file for a word processing application. In the example of the file being a virtual machine image file, processing logic may identify a file that has stale data by receiving a message that a virtual machine instance or a host machine has experienced a system failure and is unavailable. Processing logic may receive an error message from the virtual machine instance or the host machine, for example, when the virtual machine instance or the host machine is powered back on.

At block 303, processing logic acquires a lock on the entire file and inspects a local change log and change logs that are stored with copies of the file on various storage servers to identify which servers (e.g., storage servers) have a copy of the file that is fresh and which servers have a copy that is stale at block 305. The change logs can be stored in one or more extended attributes of the corresponding file. Each copy of the file, for example on different storage servers, can store a part of the change log in one or more extended attributes of the file. Processing logic can acquire a full-file lock to prevent any write access on the file while processing logic inspects the change logs. The change logs for each copy of the file can include information of the operations (e.g., write operations) that have succeeded on each version of the copy of the file. Processing logic can inspect the change logs to create decision data indicating which servers have a fresh copy of the file and which servers have a stale copy of the file. Processing logic can store the decision data in the data store. In one implementation, the decision data is a decision matrix that identifies which servers have fresh copies of the file.

At block 307, processing logic acquires a lock on a region of the file and releases the previous lock at block 309. For example, processing logic releases the lock on the entire file after processing logic acquires the lock on the region to ensure that another system which may be attempting to self-heal the file does not interfere with the current self-healing process. A region can be a configurable number of bytes of data. For example, a region may be 128 kilobytes. In another example, a region may be 64 kilobytes. In one implementation, each region of the file is the same size. In another implementation, some regions of the file may be a different size.

At block 311, processing logic determines whether to self-heal the data in the locked region. A file can contain regions that have data that is not stale. Processing logic can calculate a checksum for the locked region using the data in the locked region and compare the checksum value to a checksum value for the corresponding region in a fresh copy of the file. The checksum value for the corresponding region in a fresh copy of the file may be stored in the data store. Processing logic can calculate the checksum using a checksum function or checksum algorithm.

If there is a match between the checksum for the locked region and the the checksum for the corresponding region in a fresh copy of the file (block 311), processing logic determines that the locked region contains the current version of data and proceeds to block 315 to determine whether there is another region in the file to process. If there is a mismatch between the checksum for the locked region and the checksum for the corresponding region in a fresh copy of the file (block 311), processing logic self-heals the data in the locked region at block 313. Processing logic can identify which servers have a fresh copy of the data from the decision data that is stored in the data store. Processing logic can read the data from the corresponding region in a fresh copy of the file in an identified server and write the data from the fresh copy over the stale data in the locked region.

At block 315, processing logic determines whether there is another region in the file to process. If there is another region in the file to process, processing logic returns to block 307 to acquire a lock on the next region of the file. At block 309, processing logic releases the previous lock. For example, processing logic releases the lock on the preceding region. If there is not another region in the file to process (block 315), processing logic acquires a lock on the entire file at block 317. At block 319, processing logic releases the lock on the locked region. At block 321, processing logic updates the change log for the file to indicate that the file is self-healed to the current version and releases the lock on the entire file at block 323. Method 300 can be an iterative process. The number of iterations can depend on the number of files that have stale data.

Figure 4:
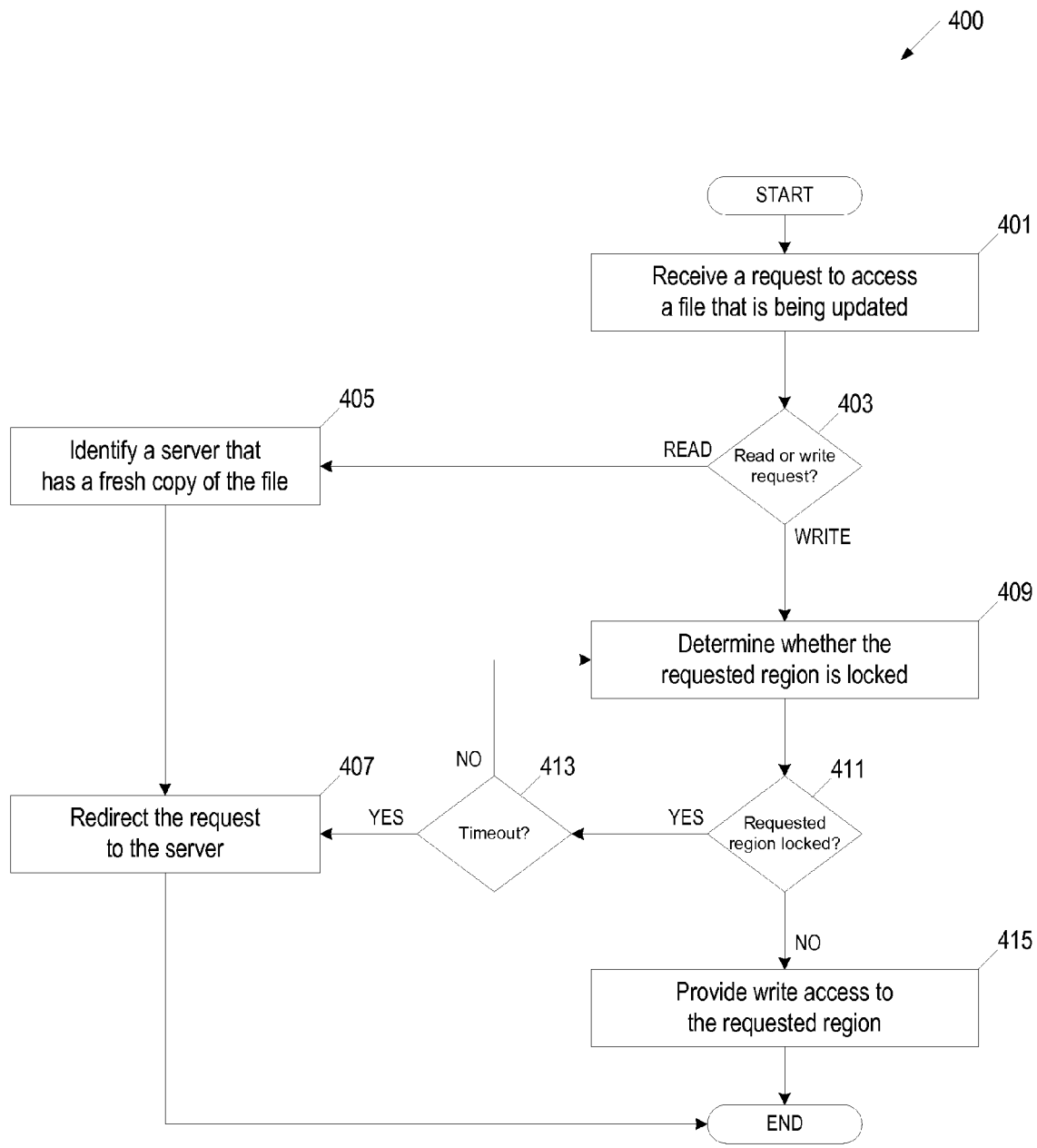
FIG. 4 is a flow diagram illustrating an implementation for a method for providing write access to a file that is being self-healed.

FIG. 4 is a flow diagram of an implementation of a method 400 of handling requests to access a file when the file is being self-healed. Method 400 can be performed by processing logic that can comprise hardware (e.g., circuitry, dedicated logic, programmable logic, microcode, etc.), software (e.g., instructions run on a processing device), or a combination thereof. In one implementation, method 300 is performed by granular self-healing module 127A-D in a machine 120A-B, 140A-B of FIG. 1.

At block 401, processing logic receives a request to access a file that is being self-healed. The request can be received from, for example, and not limited to, an application, a storage server, a file system client, etc. At block 403, processing logic determines whether the request is a read request or a write request. If the request is a read request, processing logic identifies a server that has a fresh copy of the file at block 405. Processing logic can use decision data that is stored in a data store that is coupled to the granular self-healing module to identify a server that has a fresh copy of the file. At block 407, processing logic redirects the read request to the identified server. For example, processing logic may send a message to the requester (e.g., application, storage server, file system client, etc.) that identifies a storage server that contains a fresh copy of the file. In another example, processing logic may forward the request to a storage server that contains a fresh copy of the file.

If the request is a write request (block 403), processing logic determines whether the requested region is locked at block 409. In one implementation, if the requested region is locked (block 411), processing logic determines whether a timeout has occurred at block 413. The timeout can be a user-configured value that is stored as configuration data in the data store. If a timeout has occurred, processing logic can redirect the write request to another server at block 407. Processing logic may identify a server using decision data that is stored in the data store. If a timeout has not occurred (block 413), processing logic returns to block 409 to make another determination of whether the requested region is locked. If the requested region is not locked (block 411), processing logic provides write access to the requested region at block 415.

Figure 5:
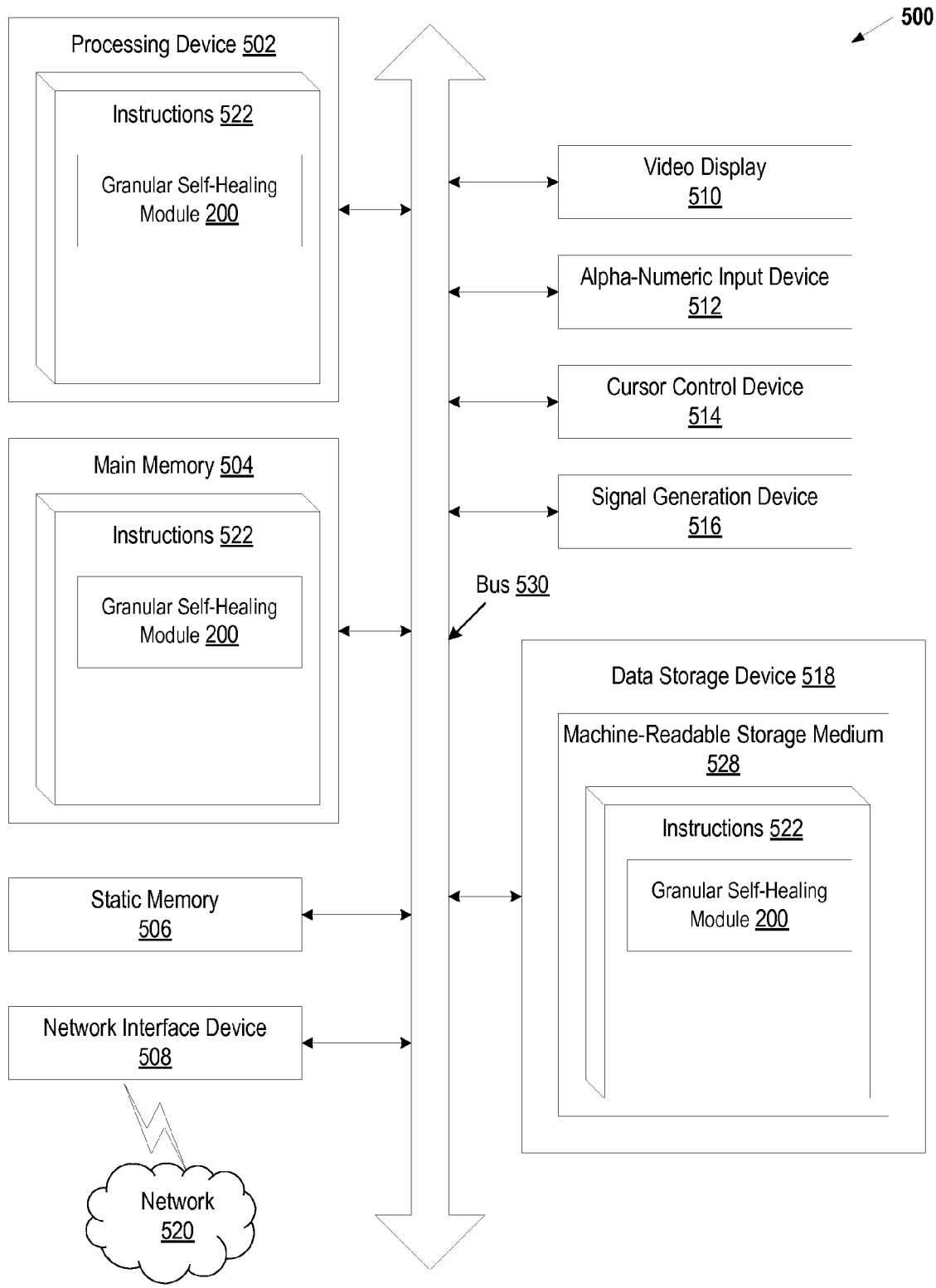
FIG. 5 is a block diagram of an example computer system that may perform one or more of the operations described herein.

FIG. 5 illustrates an example machine of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. The processing device 502 is configured to execute instructions 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-readable storage medium 528 (also known as a computer-readable medium) on which is stored one or more sets of instructions or software 522 embodying any one or more of the methodologies or functions described herein. The instructions 522 may also reside, completely or at least partially, within the main memory 504 and/or within the processing device 502 during execution thereof by the computer system 500, the main memory 504 and the processing device 502 also constituting machine-readable storage media.

In one implementation, the instructions 522 include instructions for a granular self-healing module (e.g., granular self-healing module 200 of FIG. 2) and/or a software library containing methods that call modules in a granular self-healing module. While the machine-readable storage medium 528 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "acquiring" or "self-healing" or "receiving" or "providing" or "redirecting" or "calculating" or "determining" or "identifying" or "reading" or "writing" or "releasing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
   for each of a plurality of regions of a file:
      acquiring a lock on a current region of the file;
      releasing a lock on a preceding region of the file;
      determining whether to self-heal the locked region of the file;
      in response to a determination to self-heal the locked region of the file, self-healing, by a processing device, stale data in the locked region of the file using current data and acquiring a lock on a next region of the file; and
      in response to a determination not to self-heal the locked region of the file, acquiring a lock on the next region of the file; and
   for at least one of the plurality of regions of the file:
      receiving a write request to modify an unlocked region of the file during the self-healing of the locked region of the file; and
      providing write access to the unlocked region of the file during the self-healing of the locked region of the file.

2. The method of claim 1, further comprising, for at least one of the plurality of regions of the file:
   receiving a request to read an unlocked region of the file during the self-healing of the locked region of the file; and
   redirecting the request to a copy of the file comprising the current data.

3. The method of claim 1, wherein determining whether to self-heal the locked region comprises:
   calculating a checksum for the locked region of the file; and
   determining that the checksum does not match a checksum of a corresponding region in a copy of the file comprising the current data.

4. The method of claim 1, wherein self-healing comprises:
   identifying a copy of the file comprising the current data;
   reading the current data in a corresponding region in the copy of the file; and
   writing the current data to the corresponding region in the file that is being self-healed.

5. The method of claim 1, further comprising:
   identifying the file to be self-healed;
   acquiring a lock on the entire file; and
   identifying, from a change log, a copy of the file comprising the current data.

6. The method of claim 1, further comprising:
   acquiring a lock on a last region of the file;
   acquiring a lock on the entire file;
   releasing the lock on the last region of the file;
   updating a change log to indicate the file is self-healed; and
   releasing the lock on the entire file.

7. A non-transitory computer-readable medium including instructions that, when executed by a processing device, cause the processing device to perform operations comprising:
   for a plurality of regions of the file:
      acquiring a lock on a current region of the file;
      releasing a lock on a preceding region of the file;
      determining whether to self-heal the locked region of the file;
      in response to a determination to self-heal the locked region of the file, self-healing, by the processing device, stale data in the locked region of the file using current data and acquiring a lock on a next region of the file; and
      in response to a determination not to self-heal the locked region of the file, acquiring a lock on the next region of the file; and
   for at least one of the plurality of regions of the file:
      receiving a write request to modify an unlocked region of the file during the self-healing of the locked region of the file; and
      providing write access to the unlocked region of the file during the self-healing of the locked region of the file.

8. The non-transitory computer-readable medium of claim 7, further comprising, for at least one of the plurality of regions of the file:
   receiving a request to read an unlocked region of the file during the self-healing of the locked region of the file; and
   redirecting the request to a copy of the file comprising the current data.

9. The non-transitory computer-readable medium of claim 7, wherein determining whether to self-heal the locked region comprises:
   calculating a checksum for the locked region of the file; and
   determining that the checksum does not match a checksum of a corresponding region in a copy of the file comprising the current data.

10. The non-transitory computer-readable medium of claim 7, wherein self-healing comprises:
    identifying a copy of the file comprising the current data;
    reading the current data in a corresponding region in the copy of the file; and
    writing the current data to the corresponding region in the file that is being self-healed.

11. The non-transitory computer-readable medium of claim 7, further comprising:
    identifying the file to be self-healed;
    acquiring a lock on the entire file; and
    identifying, from a change log, a copy of the file comprising the current data.

12. The non-transitory computer-readable medium of claim 7, further comprising:
   acquiring a lock on a last region of the file;
   acquiring a lock on the entire file;
   releasing the lock on the last region of the file;
   updating a change log to indicate the file is self-healed; and
   releasing the lock on the entire file.

13. A system comprising:
   a memory; and
   a processing device operatively coupled to the memory, the processing device for a plurality of regions of a file:
      acquire a lock on a current region of the file;
      release a lock on a preceding region of the file;
      determining whether to self-heal the locked region of the file;
      in response to a determination to self-heal the locked region of the file, self-heal stale data in the locked region of the file using current data and acquire a lock on a next region of the file; and
      in response to a determination not to self-heal the locked region of the file, acquire a lock on the next region of the file; and
   for at least one of the plurality of regions of a file:
      receive a write request to modify an unlocked region of the file during the self-healing of the locked region of the file; and
      provide write access to the unlocked region of the file during the self-healing of the locked region of the file.

14. The system of claim 13, wherein the processing device is further to, for at least one of the plurality of regions of the file:
   receive a request to read an unlocked region of the file during the self-healing of the locked region of the file; and
   redirect the request to a copy of the file comprising the current data.

15. The system of claim 13, wherein determining whether to self-heal the locked region comprises:
   calculating a checksum for the locked region of the file; and
   determining that the checksum does not match a checksum of a corresponding region in a copy of the file comprising the current data.

16. The system of claim 13, wherein the processing device is further to:
   identify the file to be self-healed;
   acquire a lock on the entire file; and
   identify, from a change log, a copy of the file comprising the current data.

17. The system of claim 13, wherein the processing device is further to:
   acquire a lock on a last region of the file;
   acquire a lock on the entire file;
   release the lock on the last region of the file;
   update a change log to indicate the file is self-healed; and
   release the lock on the entire file.

* * * * *